May 8, 1928.
G. E. SAUNDERS
BREAD TOASTER
Filed June 22, 1927
1,668,607
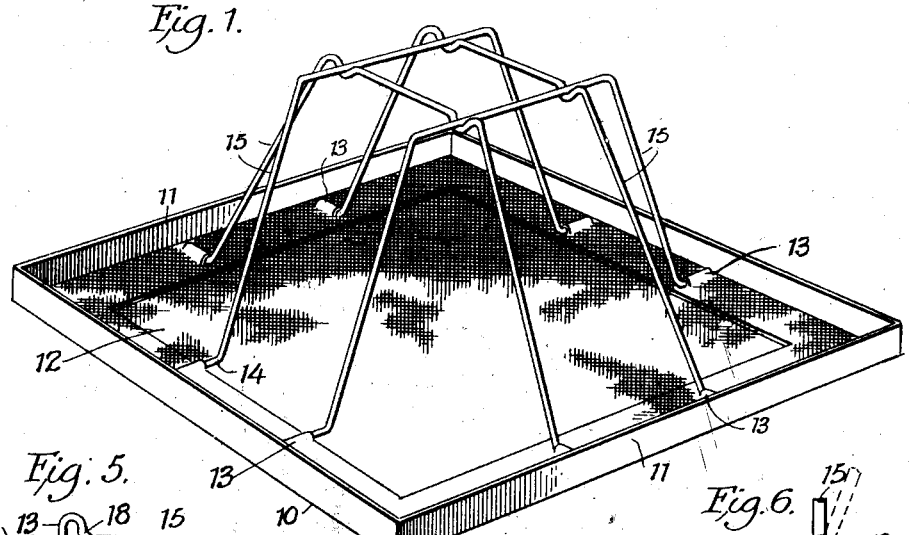
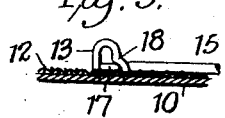
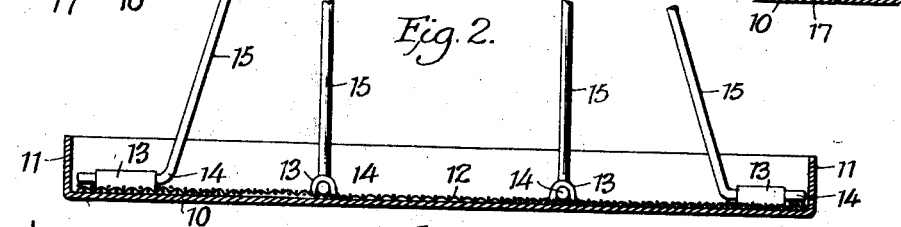
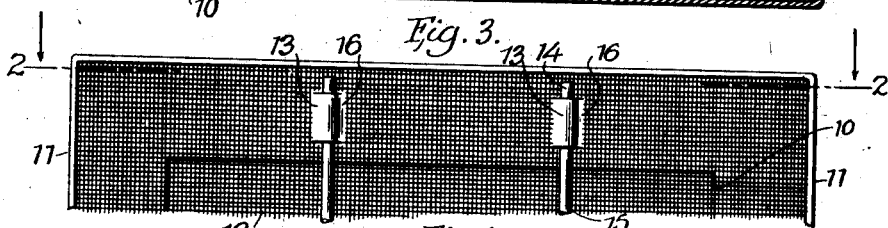
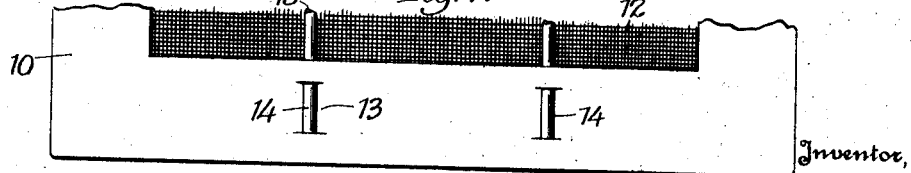
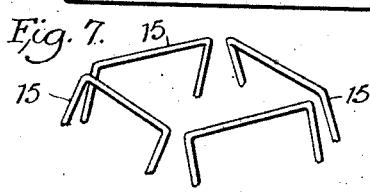
Inventor,
George E. Saunders.
By James P. Duhamel,
Attorney Patented May 8, 1928.

1,668,607

UNITED STATES PATENT OFFICE.

GEORGE E. SAUNDERS, OF BROOKLYN, NEW YORK.

BREAD TOASTER.

Application filed June 22, 1927. Serial No. 200,586.

This invention relates to bread toasters, and has for its object the rapid performance of its work so that a minimum amount of gas or other fuel may be used and the bread may not be burned or charred by contact with overheated parts of the device.

To accomplish this object the toaster comprises racks against which the bread is lodged and the latter is subjected to the heat of wire gauze on the base that carries the racks and the gauze is made red hot by the jets of a gas stove.

Those and other objects and details of the invention are more fully described in the following specification, set forth in the claims and illustrated in the accompanying drawings wherein:

Figure 1 is a perspective view of the improved toaster.

Fig. 2 is a sectional view on the line 2—2 of Fig. 3.

Fig. 3 is a plan view of one edge of the toaster.

Fig. 4 is a view of the same edge of the toaster.

Fig. 5 is a detail view of a rack bearing showing the latter folded down.

Fig. 6 is a similar view showing the rack raised.

Fig. 7 is a view of the assembly of the tops of the racks.

Bread toasters of a similar character that have been heretofore used are mounted on a base of sheet metal that is adapted to be located over a gas flame or series of jets.

To perform its work the base must be heated to a red heat and the bread is parched on the side exposed to the heat from the base.

This process is slow and the bread is consequently dried and hardened throughout where the toasting of the sides only is desired and at the same time a great amount of gas is consumed in heating the sheet metal. It is also necessary to elevate the lower edge of the bread from the base for fear of burning and charring same.

The present invention comprises a metal base frame 10 having the upturned flange 11 and enclosing the sheet 12 of wire gauze or mesh of the desired texture to prevent the passage of a flame or the spent gases over which the device may be located.

From the frame 10 and around the opening are punched loops 13 to form bearings for the lower ends 14 of a series of wire racks 15 that constitute trunnions on which the said racks are raised and lowered for use or for storage or packing.

The gauze sheet 12 has openings cut at 16 where it fits over the loops and flat on the top of the frame 10 within the flange 11, and when the trunnions 14 are fitted in their bearings they will lock the two parts together and necessitate no other means to attach the gauze to the frame.

While the construction and arrangement of the trunnions 14, as shown in Figs. 2 and 3, provide abundant friction between them and the wire of the gauze to cause the racks to stand in their elevated position, in case it is not desired to connect the frames at their upper ends as shown in Fig. 1, the firm support of the racks may be assumed by means shown in Figs. 5 and 6 where it will be seen that the ends of the wires are flattened as at 17 and the loop 13 has a depression 18 in one side to divide the bearing into two recesses for the reception of the flattened end or when the frame is raised or lowered, and a little pressure is required to have end 17 pass the depression 18. With this arrangement the racks may at their upper ends occupy the relations shown in Fig. 7 and abundant rigidity secured to enable each rack to support a slice of bread. When folded down flat the racks will occupy very little space and fit within the flanges of the frame.

When in use the toaster is located over the lighted burner of the ordinary type of gas burner, and the wire gauze is subjected to the flame. Each wire of the mesh being small is immediately heated to a red heat and the whole sheet 12 provides without delay the heat necessary for the immediate toasting of the exposed side of the bread, leaving the interior soft and eatable.

The above described construction also needs no screws or rivets and the parts are readily and quickly assembled and hold each other together.

It is obvious that the parts and their arrangements may be further modified without departing from the essential features above described or from the scope of the appended claims.

What I claim as new is:

1. In a bread toaster, the combination of a frame having an upturned flange on its outer edge, a wire screen enclosed in the frame, loops struck up from the frame and passing through the screen, racks journalled in the loops, and frictional means at the journals of the racks to hold them up or down.

2. In a bread toaster, the combination of a frame of sheet metal having an up-turned flange at its outer edge, a wire screen within the flange, loops struck up from the frame and passing through the screen, racks journalled in the loops and having flattened ends, and frictional means in the loops to lock the flattened ends and hold the racks in a raised or lowered position.

3. In a bread toaster, the combination of a frame of sheet metal having an upturned flange at its outer edge, a wire screen within the flange, loops struck up from the frame and having a depression formed at one side, racks adapted to be raised to support the bread, and flattened ends to the racks journalled in the loops and adapted to be held in a raised or a lowered position at one side of the depression.

In testimony whereof I hereunto affix my signature.

GEORGE E. SAUNDERS.